US006251988B1

(12) United States Patent
Blum et al.

(10) Patent No.: US 6,251,988 B1
(45) Date of Patent: Jun. 26, 2001

(54) POLYURETHANE SOLUTIONS TERMINATED WITH AMINO-FUNCTIONAL HETEROCYCLIC STOPPERS

(75) Inventors: Harald Blum, Leverkusen; Detlef-Ingo Schütze, Köln, both of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/537,589

(22) Filed: Mar. 28, 2000

(30) Foreign Application Priority Data

Mar. 30, 1999 (DE) .............................. 199 14 293

(51) Int. Cl.[7] .................. C08J 3/00; C08K 3/20; C08L 75/00; C08G 18/81; B05D 3/02
(52) U.S. Cl. .................. 524/590; 427/372.2; 427/385.5; 524/589; 528/45
(58) Field of Search .................. 524/589, 590; 528/45; 427/372.2, 385.5

(56) References Cited

U.S. PATENT DOCUMENTS

| 4,485,227 | 11/1984 | Fox | 528/61 |
|---|---|---|---|
| 4,530,990 | 7/1985 | Halpaap et al. | 528/53 |
| 4,574,147 | 3/1986 | Meckel | 528/64 |
| 5,425,978 | 6/1995 | Berneth et al. | 428/195 |
| 5,693,737 | * 12/1997 | Reiff et al. | 528/45 |
| 5,739,216 | * 4/1998 | Duecoffre et al. | 528/438 |

FOREIGN PATENT DOCUMENTS 25 00 921    7/1976   (DE) .

OTHER PUBLICATIONS

Methoden Der Organischen Chemie, (Houben–Weyl) vol. E20, (month unavailable), 1987, pp. 1641–1645, D. Dieterich, Georg Thieme Verlag, "Polyurethane".

* cited by examiner

Primary Examiner—Patrick D. Niland
(74) Attorney, Agent, or Firm—Joseph C. Gil; Thomas W. Roy

(57) ABSTRACT

The present invention relates to solutions of polyurethanes in organic solvents, wherein the polyurethanes are the reaction products of a) one or more at least difunctional polyols having a number average molecular weight of 500 to 16,000,
b) one or more at least difunctional polyisocyanates having a molecular weight of 140 to 1500,
c) optionally one or more low molecular weight at least difunctional alcohols and/or amines having a molecular weight of 32 to 500 and
d) one or more monoamino-functional heterocyclic compounds.

The present invention also relates to a process for preparing these polyurethane solutions and to their use in lacquers, coatings, sealants and/or adhesives.

17 Claims, No Drawings

POLYURETHANE SOLUTIONS TERMINATED WITH AMINO-FUNCTIONAL HETEROCYCLIC STOPPERS

BACKGROUND OF THE INVENTION

1. Field of the Invention

The present invention relates to polyurethane solutions having amino-functional heterocyclic stoppers, a process for preparing these polyurethane solutions and the use of the corresponding polyurethane solutions.

2. Description of the Prior Art

Polyurethane solutions are known and are described, e.g., in D. Diederich, Methoden der Organischen Chemie (Houben-Weyl), vol. E20, Georg Thieme Verlag, 1997 and literature cited therein.

Polyurethane solutions are generally high molecular weight reaction products of aliphatic and/or aromatic di- or polyisocyanates with di- or tri-functional polyols and/or diamines. Reaction of the isocyanate compounds with the hydroxyl and/or amino-functional compounds takes place at an equivalent ratio of approximately 1:1 to produce the required high molecular weight.

In order to obtain soluble and readily processable products, the chain building reaction has to be terminated when the desired molecular weight or desired viscosity of the polyurethane solutions is achieved. This generally takes place by adding low molecular weight, reactive compounds, such as a monoamine (DE-A-2,633,293), a monoisocyanate or acetanhydride (DE-A-2,500,921, EP-A-0,129,396), a monofunctional alcohol, e.g., methanol, or by adding other chain terminating compounds, e.g., butanonoxime (DE-A-3,142,706).

When practiced on an industrial scale an excess of chain terminator is generally added to ensure reliable stopping of the reaction. This excess, however, may also have a deleterious effect on the properties of the coatings, which may then become manifest in the form of odors, exudation or adhesion problems or by defects in the film due to the formation of bubbles or craters. Also, the storage stability of polyurethane solutions may be impaired. Excess free monoamine, monoisocyanate or reactive monoalcohol may lead to considerable viscosity changes or to serious degradation (associated with an impairment in the properties due to a slow reaction with the urethane or ester bonds in the polymer), especially during storage.

Since polymer solutions generally no longer contain reactive groups, only a physical drying process takes place after application. Chemical linking via reactive groups at the ends of chains with reactive groups in the substrate is not possible.

DE-A-3,401,753 discloses polyurethane solutions with terminal amino groups which are available for subsequent cross-linking reactions. However, these require the subsequent addition of a reaction partner.

An object of the present invention is to provide polyurethane solutions which do not have the disadvantages mentioned above, in particular, to provide polyurethane solutions which contain polyurethanes having a high molecular weight, which can be prepared and stopped reliably and which do not cause any problems due to inadequate adhesion or inadequate optical film properties when used in coatings. Thus, it has to be ensured that any excess amounts of stopper which are added do not impair the storage stability of the solution and do not impair the properties of the coating.

Surprisingly, it has now been found that polyurethane solutions which incorporate amino-functional heterocyclic compounds as stoppers satisfy these requirements. Coatings based on the polyurethane solutions according to the invention have good adhesive properties and a particularly pleasant feel. It was also found that the polyurethane solutions according to the invention are extremely suitable for preparing high quality coatings with high permeability to water vapor and thus exhibit an associated outstanding wearer comfort. The coatings according to the invention, therefore, combine high permeability to water vapor with very good water resistance or waterproof character and a relatively low degree of swelling in water.

SUMMARY OF THE INVENTION

The present invention relates to solutions of polyurethanes in organic solvents, wherein the polyurethanes are the reaction products of
a) one or more at least difunctional polyols having a number average molecular weight of 500 to 16,000,
b) one or more at least difunctional polyisocyanates having a molecular weight of 140 to 1500,
c) optionally one or more low molecular weight at least difunctional alcohols and/or amines having a molecular weight of 32 to 500 and
d) one or more monoamino-functional heterocyclic compounds.

The present invention also relates to a process for preparing these polyurethane solutions by
1) initially preparing an isocyanate-functional polyurethane in a one or two stage reaction by reacting polyol (a), polyisocyanate (b), and optionally low molecular weight component (c),
2) optionally increasing the molecular weight of the product of 1) by chain extension with component (c) and
3) subsequently reacting the product of 2) with a monoamino-functional heterocyclic compound (d) to form a high molecular weight polyurethane which no longer contains any free isocyanate groups, wherein either before, during or after the first reaction step enough organic solvent is added for the resulting polyurethane solution to have a solids content of 9 to 65 wt. %.

Finally, the present invention relates to the use of the polyurethane solutions, wherein at least 50% of monoamino-functional heterocyclic compounds are chemically incorporated via urea bonds, in lacquers, coatings, sealants and/or adhesives.

DETAILED DESCRIPTION OF THE INVENTION

The term polyurethane solution also includes polyurethane/polyurea solutions and also solutions which contain e.g. trimeric, uretdione, allophanate and/or biuret structural units in small amounts in addition to urethane and/or urea structural units. The solutions are generally clear, although they may also include solutions which have a turbid to opaque appearance, but this is less preferable.

In the polyurethane solutions according to the invention the polyurethanes are preferably based on the reaction products of
a) 40 to 92 wt. %, preferably 47 to 88 wt. %, of one or more at least difunctional polyols having a molecular weight of 500 to 16,000,
b) 7 to 50 wt. %, 10 to 40 wt. %, of one or more at least difunctional polyisocyanates having a number average molecular weight of 140 to 1500, preferably 168 to 300, c) 0 to 20 wt. %, 0.5 to 17 wt. %, of one or more low molecular weight at least difunctional alcohol and/or amines having a number average molecular weight of 32 to 500 and d) 0.1 to 3 wt. %, 0.3 to 1.10 wt. %, of one or more monoamino-functional heterocyclic compounds.

Polyol components (a) which are suitable for preparing the polyurethane solutions according to the invention include polyester polyols (e.g., as described in Ullmanns Enzyklopadie der technischen Chemie, 4th edition, vol. 19, p. 62–65). Suitable raw materials for preparing these polyester polyols are difunctional alcohols such as ethylene glycol, 1,2- and 1,3-propylene glycol, 1,3-, 1,4- and 2,3-butanediol, 1,6-hexanediol, neopentyl glycol, trimethylhexanediol, triethylene glycol, tetraethylene glycol, hydrogenated bisphenols, trimethylpentanediol, diethylene glycol, dipropylene diglycol, 1,4-cyclohexanediol and 1,4-cyclohexanedimethanol; and difunctional carboxylic acids or their anhydrides such as adipic acid, phthalic acid (anhydride), isophthalic acid, maleic acid (anhydride), terephthalic acid, tetrahydrophthalic acid (anhydride), hexahydrophthalic acid (anhydride), succinic acid (anhydride), fumaric acid, azelaic acid and dimeric fatty acids.

Polyester raw materials, which are suitable for use in smaller amounts, include monocarboxylic acids such as benzoic acid, 2-ethylhexanoic acid, oleic acid, Soya oil fatty acid, stearic acid, peanut oil fatty acid, linoleic acid, nonanoic acid, cyclohexane monocarboxylic acid, isononanoic acid, sorbic acid and konjuenic acid; higher functional carboxylic acids or alcohols such as trimellitic acid (anhydride), butanetetracarboxylic acid, trimeric fatty acids, trimethylolpropane, glycerol, pentaerythritol, castor oil, dipentaerythritol; and other known polyester raw materials.

Other suitable polyol components (a) include polycarbonate diols, which may be obtained by reacting diphenyl or dimethyl carbonate with low molecular weight diols or triols, and ε-caprolactone-modified diols or triols of the type mentioned above. Also suitable are hydroxy-functional silicones or polysiloxanes, such as Baysilone OF (Bayer AG).

Other suitable polyol components (a) include polyester diols based on lactones, which may be homopolymers or mixed polymers of lactones, and are preferably addition products of lactones, such as ε-caprolactone or gamma-butyrolactone, which have terminal hydroxyl groups with difunctional starter molecules. Suitable starter molecules include the diols mentioned above, and also low molecular weight polyester diols or polyether diols. The corresponding hydroxycarboxylic acids may also be used instead of polymers of lactones.

Other suitable polyol components (a) include polyether polyols. They can be obtained, e.g., by the polymerization of ethylene oxide, propylene oxide and/or tetrahydrofuran with themselves, e.g., in the presence of $BF_3$ or basic catalysts, or by the addition of these compounds, optionally in admixture or in sequence, to starter compounds having reactive hydrogen atoms such as alcohols, amines, aminoalcohols or water.

Mixtures of the preceding polyols may be used as polyol components (a), and also mixtures with other known polyols, such as polyester-amides, polyetheresters, polyacrylates and polyols based on epoxide resins.

Polyols (a) have a hydroxyl number of 5 to 350, preferably 8 to 200 mg KOH/g of substance. The number average molecular weight of polyols (a) is between 500 and 16,000, preferably between 500 and 15,000, wherein in a preferred embodiment at least some polyols have a molecular weight of >9,000 g/mol.

Hydrolysis-resistant polyols having a number average molecular weight of 300 to 3500, preferably 900 to 2500, and containing at least 50% of polycarbonate diols, polytetrahydrofuran diols and/or difunctional or trifunctional polyethers based on propylene oxide or propylene oxide/ethylene oxide are preferred. These hydrolysis-resistant polyols may be used together with polyester polyols, preferably polyester polyols having comparably good resistance to hydrolysis, such as polyesters based on phthalic anhydride, isophthalic acid, dimeric fatty acids, adipic acid, hexanediol, butanediol and/or neopentyl glycol.

In another preferred embodiment, hydrophilic polyols (such as ethylene oxide polyethers, ethylene oxide/propylene oxide polyethers or polyesters based on triethylene glycol or tetraethylene glycol and dicarboxylic acids) are used in amounts such that the coatings prepared therefrom are permeable to water vapor. In this embodiment component (a) preferably contains 10 to 60 wt. % of hydrophilic polyols in addition to 23 to 50 wt. % of non-hydrophilic polyols, wherein these percentages are based on the total solids content of the polyurethane and wherein the total amount of component (a) is a maximum of 92 wt. % of the total solids content of the polyurethane.

The resulting polyurethane solutions are extremely suitable for preparing high quality coatings with a high permeability to water vapor and demonstrate the associated, outstanding wearer comfort. Coatings according to the invention then combine high permeability to water vapor with very good water resistance or waterproof character and a relatively low degree of swelling in water.

The total amount of hydrophilic constituents, polyols (a) and optionally hydrophilic diols or diamines (c) is 10 to 60, preferably 20 to 45 wt. %, based on the total solids content of the polyurethane solution.

Suitable components (b) include at least difunctional polyisocyanates having a number average molecular weight of 140 to 1500, preferably 168 to 300. Examples include hexamethylene diisocyanate (HDI), isophorone diisocyanate (IPDI), 4,4'-diisocyanato-dicylcohexylmethane ($H_{12}$MDI), 1,4-butane diisocyanate, hydrogenated 2,4-and/or 2,6-diisocyanatotoluene, hexahydro diisocyanatoxylene, 2,4- or 2,6-diisocyanatotoluene (TDI), xylylene diisocyanate and 4,4'-diisocyanatodiphenylmethane (MDI). Polyisocyanates prepared from the preceding or other known isocyanates and containing uretdione, biuret, isocyanurate, iminoxadiazinedione and/or urethane groups may also be used.

The exclusive use of aliphatic and/or cycloaliphatic diisocyanates having a molecular weight of 168 to 262, such as isophorone diisocyanate, hexamethylene diisocyanate, diisocyanato-dicyclohexylmethane (Desmodur W, Bayer AG) and/or hydrogenated 2,4- and/or 2,6-diisocyanatotoluene is preferred. More preferably at least 75 wt. % of component (b) is selected from isophorone diisocyanate or hydrogenated 2,4- and/or 2,6-diisocyanatotoluene.

The exclusive use of aromatic diisocyanates having a molecular weight of 174 to 280, in particular 2,4- and/or 2,6-diisocyanatotoluene and/or 4,4'-diisocyanatodiphenylmethane is also preferred.

In a preferred embodiment, allophanate group-containing, difunctional polyisocyanates are used as component (b). These compounds are obtained by reacting diisocyanates, preferably aromatic diisocyanates such as MDI or TDI, with aliphatic, linear monoalcohols having 4 to 18 carbon atoms such as n-butanol, 1-hexanol, 2-ethylhexanol or stearyl alcohol, optionally using an appropriate catalyst such as zinc acetylacetonate, at temperatures of 40 to 110° C. to produce the allophanate. The reaction of 2 molecules of diisocyanate with one molecule of monoalcohol results in the production of a diisocyanate having allophanate groups; higher homologues may also be produced. It is also possible to form allophanate groups in situ during the preparation of the polyurethanes according to the invention. The use of allophanate group-containing diisocyanates surprisingly results in polyurethanes that can be used to prepare coatings having particularly good resistance to the effects of solvents or water, and also a pleasant feel.

Components (c) include low molecular weight compounds having a number average molecular of 32 to 500 and at least two isocyanate-reactive groups, preferably hydroxyl and/or primary or secondary amino groups. Examples include ethylene glycol, 1,2- or 1,3-propylene glycol, 1,4-butanediol, neopentyl glycol, 1,6-hexanediol, trimethylpentane diol, trimethylolpropane, glycerol, the reaction product of 2 moles of propylene carbonate and 1 mole of hydrazine, ethylene diamine, diethylene triamine, isophorone diamine, hexamethylene diamine, acetonazine, 4,4'-diaminocyclohexylmethane, hydroxyethyl ethylene diamine, ethanolamine, diethenolamine, isopropanolamine, diisopropanolamine, methylethanolamine, aminomethylpropanol, hydrazine (hydrate), propylene diamine, dimethylethylene diamine, adipic acid dihydrazide, 2-aminoethylaminoethane sulfonate, the 1:1 reaction product of acrylic acid and isophorone diamine or ethylene diamine, dimethylolacetic acid, 2,2'-dimethylolpropionic acid, 2,2'-dimethylolbutyric acid, 2,2'-dimethylolpentanoic acid, sulfonate diols optionally containing ether groups (e.g., as described in U.S. Pat. No. 4,108,814), amino-functional sulfonates with one or two amino groups and N-2-(aminoethyl)-3-aminopropyltrimethoxysilane.

If component (c) is co-used in the first step of a one or two stage reaction, then dihydroxy-functional compounds, in particular ethylene glycol, 1,4-butanediol, 1,6-hexanediol or sulfonate diols containing ether groups, are preferably used.

If component (c) is used in the second or an additional reaction step, preferably after the addition of solvent, then diamino-functional compounds, in particular ethylene diamine, isophorone diamine, 4,4'-diaminodicyclohexylmethane, hydrazine (hydrate) adipic acid dihydrazide or 2-aminoethylaminoethane sulfonate, are preferably used.

In a preferred embodiment, the previously described hydrophilic difunctional compounds containing salt groups are used as component (c), in amounts of 2 to 16 wt. %, preferably 2.5 to 13 wt. % (based on the total solids content of the polyurethane solutions), optionally in combination with hydrophilic polyols (a), in order to obtain coatings having a water vapor permeable character. To obtain coatings with a particularly high permeability to water vapor, mixtures of hydrophilic components (c) and hydrophilic polyols (a) are preferably used.

In a preferred embodiment, hydrazine (hydrate), adipic acid dihydrazide and/or the reaction product of 2 moles of propylene carbonate and 1 mole of hydrazine are used as component (c), in amounts of 0.1 to 1.5 wt. %, based on the total solids content of the polyurethane solutions Monoamino-functional heterocyclic components (d) are preferably used in amounts of 0.1 to 0.3 wt. %, preferably 0.3 to 1.1. wt. %, based on the total solids content of the polyurethane solutions. Suitable components (d) include 1,2,4-triazole, 3,5-dimethylpyrazole, benzotriazole, benzimidazole, imidazole, 2-methylimidazole, 1,2,3-triazole, pyrazole, pyrrole, tetrazole. Especially preferred components are 1,2,4-triazole, 3,5-dimethylpyrazole, benzotriazole and/or benzimidazole.

Component (d) is used in an amount such that at least 1 equivalent, preferably 1.15 equivalents and more preferably 1.3 equivalents of component (d) are used per equivalent of isocyanate groups. The monoamino-functional heterocyclic compounds (d) are preferably used in the free form in the polyurethane solutions according to the invention.

Surprisingly, it was found that these polyurethane solutions have improved thermal stability, in particular when subjected to temperatures higher than 120° C., which may occur during drying or curing procedures after application as lacquers or coatings.

The polyurethane solutions according to the invention are prepared by first preparing an isocyanate-functional polyurethane in a one or two stage reaction from polyols (a), at least difunctional polyisocyanates (b) and optionally low molecular weight component (c). The isocyanate-functional polyurethane is then chain extended to increase the molecular weight in a further reaction step by reaction with an at least difunctional component (c). If the isocyanate content reaches 0 before achieving the desired viscosity, small amounts of 4,4'-MDI and optionally small amounts of 1,4-butanediol can be added. Subsequently the polymer is chain terminated by reaction with a monoamino-functional heterocyclic compound (d) resulting in a high molecular weight polyurethane or polyurethane/polyurea which no longer contains any free isocyanate groups. Either before, during or after the first reaction step sufficient organic solvent is added for the resulting polyurethane or polyurethane/polyurea solution to have a solids content of 9 to 65 wt. %.

The components may be reacted at room temperature to 120° C. Preferably the reaction generally takes place at higher temperatures, e.g. at 60 to 120° C., at the start of preparation and at lower temperatures, e.g. at room temperature to 60° C., at the end during chain extension and the chain-stopping reaction.

The components may be reacted with the addition of catalysts such as dibutyltin dilaurate, tin 2-octoate, dibutyltin oxide or diazabicyclononane.

Suitable solvents for preparing polyurethane solutions according to the invention include dimethylformamide, dimethylacetamide, N-methylpyrrolidone, methylethyl ketone, methylisobutyl ketone, cyclohexanone, toluene, xylene, tert-butanol, isopropanol, ethyl acetate, butyl acetate, methoxypropanol, butyl glycol, methoxypropyl acetate and isobutanol. The type, amount and time of addition of the solvent or solvent mixture are chosen such that the end product or intermediates are soluble, the viscosity is within an industrially acceptable range, i.e. conventionally <200,000 mPa.s (23° C.), and reaction of the solvent with the polyurethane raw materials is excluded to the extent possible. This means, for instance, that alcoholic solvents should be used only when isocyanate/amine or comparably rapid reactions are taking place during preparation of the polyurethane.

The total solids content of polyurethane solutions according to the invention is 9 to 65 wt. %, preferably 20 to 50 wt. %. The viscosity of polyurethane solutions according to the invention is 1,000 to 200,000 mPa.s (23° C.), preferably 3,000 to 80,000 mPa.s (23° C.).

The molecular weight of polyurethane solutions according to the invention can be determined, e.g., by gel permeation chromatography and is preferably between 4,000 and 500,000, more preferably between 25,000 and 250,000 g/mol.

Conventional additives may be added before, during or after preparation or before or during use of polyurethane solutions according to the invention. Examples include stabilizers, light protective agents, flow control agents, matting agents, heat stabilizers, mold release agents, antioxidants, UV absorbers, hindered amine light stabilizers (HALS), defoaming agents, adhesion promoters, antistatic agents, preservatives and catalysts.

The polyurethane solutions according to the invention are suitable for use in lacquers, coatings, sealants, printing inks and adhesives. They may be used alone and/or after the addition of known additives, such as pigments, fillers, plasticizers, solvents and diluents and/or in combination with other polymers or polymer solutions or oligomers such as polyurethane solutions, polyurea solutions, polyurethane/polyurea solutions, copolymer and homopolymer solutions, chlorinated rubber solutions, nitrocellulose solutions, cellulose acetate/butyrate solutions, polyacrylate solutions, polyether (solutions), polyamide solutions, polyepoxide (solutions), polyester (solutions), polyisocyanate (solutions), melamine/aldehyde resin (solutions), urea resin (solutions), polybutadiene solutions or polyolefin solutions.

The polyurethane solutions may be used to prepare textile coatings, leather coatings, artificial leather coatings, plastics coatings, metal coatings, coatings for wood, wood materials and furniture, coatings for mineral substrates and for road-marking colors. The polyurethane solutions according to the invention may be used as primers, intermediate layers, fillers, basecoats, top coats, clear coatings, single-layer coatings, microporous coatings, adhesives for various surfaces, direct coatings and foam coatings.

They may be applied by any industrially used method such as pouring, immersing, roller application, drum application, brushing, spraying, spreading or coagulation.

EXAMPLES

Example 1

520 g of a difunctional propylene oxide polyether having a molecular weight of 2000 g/mol were weighed into a 3 liter reaction vessel equipped with stirring, cooling and heating devices and heated to 60° C. Then 205 g of 4,4'-MDI (Desmodur 44M, Bayer AG) were added and the reaction was continued at 70° C. until isocyanate content was at or slightly below the theoretical value. Then 182 g of dimethylformamide were added and the polymer was dissolved. Then 39.8 g of 1,4-butanediol were added over the course of 30 minutes at 50° C. and then a further 271 g of dimethylformamide were added. After the theoretical isocyanate content had been reached, 403 g of methylethyl ketone and 400 g of toluene were added and the mixture was cooled to 30° C. In a separate vessel, a chain extending solution containing 15.6 g of isophorone diamine and 104 g of toluene was prepared. 70% of this solution was added all at once to the isocyanate-functional polyurethane solution. The decrease in isocyanate content was then followed using IR spectroscopy. By adding small amounts of chain extending solution in several steps (a further 10% of chain extending solution was added altogether), the molecular weight was built up and followed indirectly via viscosity measurements. After reaching a viscosity of about 20,000 mPa.s, 6 g of 3,5-dimethyltriazole were added to terminate reaction and the mixture was stirred until no more isocyanate groups were detected. A 35% strength polyurethane solution with terminal heterocyclic structures was obtained having a viscosity of 21,000 mPa.s.

The viscosity remained constant during storage for 3 months at room temperature in a sealed vessel. After storage for 4 weeks in a sealed vessel at 60° C., the viscosity increased to 23,000 mPa.s was determined. The viscosity satisfied practical requirements.

A coating prepared at a film thickness 45 g/m$^2$ had the following properties:
100% modulus: 1.9 MPa
Tensile strength/elongation at break (dry): 12.3 MPa/790 %
Tensile strength/elongation at break (wet): 11.0 MPa/730%
Volume swelling with ethyl acetate: 450%
Melting point: 160° C.

These properties satisfy the requirements for using the product as a high-quality, flexible direct coating for textiles.

Comparison Example 2a

Example 1 was repeated with the exception that no chain terminator was added. The 35% strength polyurethane solution had a viscosity of 18,000 mPa.s.

When stored at 60° C. in a sealed vessel, the viscosity increased until complete cross-linking took place within 2 weeks. The solution did not have the stability required for use under practical conditions.

This confirms the effectiveness of the monoaminofunctional heterocyclic compound as a chain terminator.

Example 2b

Example 1 was repeated with the exception that the amount of chain terminator was increased by 50% in order to determine the effect of excess chain terminator on storage stability. The 35% strength polyurethane solution had a viscosity of 22,000 mPa.s. After storage for 4 weeks at 60° C. in a sealed vessel, the viscosity was 20,000 mPa.s. Thus, this solution had the stability required for use under practical conditions.

Example 3

450.5 g of a difunctional adipic acid/hexanediol/neopentyl glycol polyester having a molecular weight of 1700 g/mol (molar ratio of glycols 65:35) were weighed into a 3 liter reaction vessel equipped with stirring, cooling and heating devices and heated to 70° C. Then 122.1 g of isophorone diisocyanate (Desmodur I, Bayer AG) were added and reaction was continued at 100° C. until the theoretical isocyanate content was reached. Then 604 g of toluene were added, the polymer was dissolved and the mixture was cooled to 30° C. Immediately after the addition of 302 g of isopropanol, a chain extending solution was added over a period of 30 minutes. The chain extending solution was prepared in a separate vessel and contained 46.8 g of isophorone diamine, 302 g of isopropanol and 250 g of methoxypropanol. After completion of the addition process, a large increase in viscosity was observed. 15 minutes after this addition process, a viscosity of 25,000 mPa.s (23° C.) was reached. At this time 6 g of 1,2,4-triazole were added and the mixture was stirred until no more isocyanate groups were detected. A 30% strength polyurethane solution with terminal heterocyclic structures was obtained having a viscosity of 24,500 mPa.s.

After storage for 4 weeks in a sealed vessel at 60° C., the viscosity was 23,000 mPa.s.

Comparison Example 4

Example 2 was repeated with the exception that an equivalent amount of dibutylamine was used as the chain terminating agent.

After storage in a sealed vessel at 60° C., the viscosity fell from an initial value of 24,000 mPa.s to 12,500 mPa.s.

Comparison Example 5

Example 2 was repeated with the exception that an equivalent amount of butanone oxime was used as the chain terminating agent. A stable polyurethane solution was obtained, even after storage at 60° C.

To compare coating properties, coatings were prepared, dried and tested using the polyurethane solutions in accordance with example 3 and comparison example 5.

The film thickness was 42 g/m$^2$.

The following results were obtained:

|  | Example 3 | Comparison example 5 |
|---|---|---|
| 100% modulus | 4.8 MPa | 4.5 MPa |
| Tensile strength/ elongation at break (dry) | 49.3 MPa/580% | 45.0/450% |
| Tensile strength/ elongation at break (after a 2 week hydrolysis test) | 38.0 MPa/660% | 35.0/450% |
| Volume swelling with ethyl acetate | 400% | 450% |
| Melting point | 165° C. | 165° C. |

The results show that the polyurethane solution according to the invention can be used to prepare coatings having very good properties.

Example 6

270 g of a difunctional hydrophilic ethylene oxide polyether having a molecular weight of 2000 g/mol, 57.9 g of a difunctional aliphatic polycarbonate diol having a molecular weight of 2000 g/mol (Desmophen 2020, Bayer AG), 57.9 g of a difunctional tetrahydrofuran polyether having a molecular weight of 2000 g/mol and 52 g of 1,4-butanediol were weighed into a 3 liter reaction vessel equipped with stirring, cooling and heating devices and heated to 60° C. Then 203 g of 4,4'-MDI (Desmodur 44M, Bayer AG) and 748 g of dimethylformamide and 748 g of toluene were added and reaction was continued at 70° C. until the desired viscosity 20,000 to 30,000 mPa.s at 23° C.) was obtained. After reaching the target viscosity, 4.5 g of 1,2,4-triazole were added and the mixture was stirred until the isocyanate content was 0. A 30% strength polyurethane solution with terminal heterocyclic structures was obtained having a viscosity was 17,000 mPa.s.

The viscosity remained approximately constant during storage for 3 months at room temperature in a sealed vessel. After storage for 4 weeks in a sealed vessel at 60° C., the viscosity was 20,000 mPa.s.

A coating prepared from the polyurethane solution had the following properties:
100% modulus: 4.4 MPa
Tensile strength/elongation at break (dry): 30.9 MPa/590%
Tensile strength/elongation at break (wet): 27.7 MPa/850%
Volume swelling with ethyl acetate: 110%
Volume swelling with water: 70%
Water vapor permeability according to SST: 13,500 g m$^2$·d The permeability to water vapor was measured according to document DS 2109 TMI from the British Textile Technology Group, Manchester, England.

Surprisingly, particularly high quality coatings with high water vapor permeability were prepared. The coating was suitable for the preparation of high quality, flexible direct coatings and top coats for water vapor permeable materials in the clothing and hygiene sectors.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A solution of a polyurethane in an organic solvent, wherein the polyurethane comprises the reaction product of
   a) an at least difunctional polyol having a number average molecular weight of 500 to 16,000,
   b) an at least difunctional polyisocyanate having a number average molecular weight of 140 to 1500,
   c) optionally a low molecular weight at least difunctional alcohol and/or amine having a number average molecular weight of 32 to 500 and
   d) at least one monoamino-functional heterocyclic compound in an amount of 0.1 to 3 wt. %,
   wherein the reaction product has a molecular weight between 25,000 and 250,000.

2. The solution of claim 1 wherein the polyurethane comprises the reaction product of 40 to 92 wt. % of component a), 7 to 50 wt. % of component b), 0 to 20 wt. % of component c) and 0.1 to 3 wt. % of component d).

3. The solution of claim 1 wherein the polyurethane comprises the reaction product of 47 to 88 wt. % of component a), 10 to 40 wt. % of component b), 0.5 to 17 wt. % of component c) and 0.3 to 1.10 wt. % of component d), and wherein said at least difunctional polyisocyanate has a molecular weight of 168 to 300.

4. The solution of claim 1 wherein component a) comprises 10 to 60 wt. % of a hydrophilic polyol and 23 to 50 wt. % of a non-hydrophilic polyol, wherein the preceding percentages are based on the total solids content of the polyurethane, and wherein the total amount of component (a) is at most 92 wt. % of the total solids content of the polyurethane.

5. The solution of claim 1 wherein component b) contains at least 75 wt. % of isophorone diisocyanate and any remainder is exclusively selected from aliphatic or cycloaliphatic diisocyanates.

6. The solution of claim 1 wherein component b) is exclusively selected from 2,4- or 2,6-diisocyanatotoluene and/or 2,4-diisocyanatodiphenylmethane.

7. The solution of claim 1 wherein component b) comprises allophanate group-containing diisocyanates.

8. The solution of claim 1 wherein component c) comprises a hydrophilic difunctional compound containing salt groups in an amount of 2 to 16 wt. %, based on the total solids content of the polyurethane.

9. The solution of claim 1 wherein component a) comprises a hydrophilic polyol and component c) comprises a hydrophilic compound.

10. The solution of claim 1 wherein component d) comprises 1,2,4-triazole.

11. The solution of claim 1 wherein component d) comprises 3,5-dimethylpyrazole.

12. The solution of claim 1 wherein component d) comprises benzotriazole or benzimidazole.

13. The solution of claim 1 wherein component c) comprises hydrazine (hydrate), adipic acid dihydrazide and/or the reaction product of 2 moles of propylene carbonate with 1 mole of hydrazine, in an amount of 0.1 to 1.5 wt. %, based on the total solids content of the polyurethane.

14. A process for preparing the polyurethane solutions of claim 1 which comprises 1) initially preparing an isocyanate-functional polyurethane in a one or two stage reaction by reacting polyol (a), polyisocyanate (b), and optionally low molecular weight component (c),
2) optionally increasing the molecular weight of the product of 1) by chain extension with component (c) and
3) subsequently reacting the product of 2) with a monoamino-functional heterocyclic compound (d) to form a high molecular weight polyurethane which no longer contains any free isocyanate groups, wherein either before, during or after the first reaction step enough organic solvent is added for the resulting polyurethane solution to have a solids content of 9 to 65 wt. %.

15. A lacquer, coating, sealant or adhesive composition containing the polyurethane solution of claim 1.

16. A plastic, textile or leather coated with the polyurethane solution of claim 1.

17. A water vapor permeable textile or leather coated with the polyurethane solution of claim 1.

\* \* \* \* \*